(12) United States Patent
Aulas

(10) Patent No.: US 6,356,987 B1
(45) Date of Patent: Mar. 12, 2002

(54) MICROPROCESSING DEVICE HAVING PROGRAMMABLE WAIT STATES

(75) Inventor: Maxence Aulas, Aix-en-Provence (FR)

(73) Assignee: Atmel Corporation, San Jose, CA (US)

(*) Notice: Subject to any disclaimer, the term of this patent is extended or adjusted under 35 U.S.C. 154(b) by 0 days.

(21) Appl. No.: 09/266,045

(22) Filed: Mar. 10, 1999

(51) Int. Cl.$^7$ .............................................. G06F 13/00
(52) U.S. Cl. ........................................ 711/167; 710/58
(58) Field of Search ................................ 711/167, 101; 710/58, 107, 118, 125, 100; 713/400, 501, 502, 600, 401

(56) References Cited

U.S. PATENT DOCUMENTS

| | | | |
|---|---|---|---|
| 5,313,621 A | 5/1994 | Chan | 395/550 |
| 5,732,250 A | 3/1998 | Bates et al. | 395/55 |
| 5,809,517 A | 9/1998 | Shimura | 711/115 |
| 5,854,944 A | * 12/1998 | Catherwood et al. | 710/59 |
| 6,023,776 A | * 2/2000 | Ozaki | 714/55 |

FOREIGN PATENT DOCUMENTS

| | | |
|---|---|---|
| EP | 0386935 A2 | 9/1990 |
| EP | 0437276 A2 | 7/1991 |
| EP | 0713170 A1 | 5/1996 |

OTHER PUBLICATIONS

Siemens AG, Chapter Eight of "User's Manual for 16–Bit Microcontrollers (Edition 12.96, Version 1.0), " Copyright 1996 pp. 1–24.

* cited by examiner

Primary Examiner—Matthew Kim
Assistant Examiner—Denise Tran
(74) Attorney, Agent, or Firm—Thomas Schneck

(57) ABSTRACT

The present invention deals with the control of a data bus by a microcontroller, taking into account the fact that memory output drivers require a finite amount of time to electrically release the bus after an output operation. Each memory has an associated wait state number for selectively placing the microcontroller in a wait state of variable length subsequent to a read operation and prior to the next I/O operation.

15 Claims, 7 Drawing Sheets

MICROPROCESSING DEVICE HAVING PROGRAMMABLE WAIT STATES

TECHNICAL FIELD OF THE INVENTION

The present invention pertains to microprocessing devices and more particularly to a programmable wait state scheme for I/O with external devices.

BACKGROUND ART

Generally, whenever data is exchanged between two devices in a system, such as a microprocessing unit and a memory device, the system must ensure that the interaction between the two devices is synchronized. For example, present day microprocessors and microcontrollers are fabricated using technology which permits very high speed operation. Clock speeds of 300 MHz and higher are becoming commonplace. However peripheral devices, especially memory devices such as FLASH, SRAM, and EEPROM, typically are not capable of such high clock speeds.

A common approach to synchronizing with slower devices is to vary the duration of the bus cycle of the microprocessing device for each device access, sometimes referred to as "bus stretching," by the use of wait states. The system's address decoder decodes the address and determines which memory is to be selected. The system's control logic then determines whether the memory is one that requires a wait state and asserts a WAIT signal line if required. The microprocessing core samples the signal line during a clock cycle and goes into a wait state (in essence a do-nothing state) for one clock cycle if the line is asserted. The micro samples the line at the next clock and resumes operation when the WAIT signal line is negated (de-asserted). This provides the slower memory device enough time to internally decode the address, access the memory, and allow the data at its output buffers to stabilize.

One prior art technique of using wait states includes storing a wait state number in the memory device itself. The computing device includes logic to access this number to determine the amount of time the bus cycle needs to be extended. This approach requires specialized devices which include logic to store a wait state number and to provide it to the computing device.

Another approach using wait states is used in interrupt-driven I/O devices. Logic in the program decoder detects the occurrence of certain I/O instructions and asserts a WAIT signal to suspend operation of the microprocessor for a period of time depending on the instruction. This approach is useful for access to slower I/O devices, where the microprocessor is paused during a return-from-interrupt instruction to give the slow I/O device time to perform its action.

A problem not addressed by the above is access to multiple memory devices, where a read access to a first device is not given enough time to complete before access to another device begins, resulting in a bus clash. The problem stems from the fact that the output driver of the first device is still driving the data bus that is common to both devices when access to the other device occurs. Unless enough time is allowed to pass before the second device performs an access, both devices will attempt to drive the bus. The result is garbled data and increased power consumption due to simultaneous access by both driver circuitry. However, this problem does not always present itself. For example, consecutive read operations from the same device do not pose problems with the drive circuitry. A write operation followed by a read operation, likewise, poses no problem with the drive circuitry.

What is needed is control circuitry in a microcomputing architecture that detects access to multiple memories and inserts wait states according to the type of I/O operation being performed. It is desirable to have circuitry that can detect which memory is being accessed and insert wait states accordingly. It is further desirable to have circuitry that inserts wait states depending on the sequence of I/O operations being performed.

SUMMARY OF THE INVENTION

In a computing device having first and second external memories, a method of accessing memory comprises associating a first wait state value to the first memory and a second wait state value to the second memory, then selecting the wait state values associated with a selected one of the memories, and reading the memory. Subsequent to the step of reading and prior to the next I/O operation, the CPU is put into a wait state for a period of time proportional to the selected wait state value; i.e. wait state x clock period.

However, if the next I/O operation is to the internal memory of the CPU, then the CPU does not enter a wait state prior to the I/O operation, but rather immediately proceeds with the I/O operation. If a read operation subsequent to the internal I/O operation is made to the originally selected external memory, then no wait state is entered and access immediately proceeds. If a read operation subsequent to the internal I/O operation is made to a different external memory, then the wait state is entered for a period of time proportional to the wait state associated with the originally selected external memory, timed from the completion of the read operation.

In accordance with the present invention, a microprocessing device includes a system bus to which external memories, core logic, and a memory controller are coupled. A wait state circuit generates a wait signal which puts the core logic in a wait state. Coupled to the wait state circuit is an external bus circuit which detects the sequence of memory accesses taking place on the system bus and activates the wait state circuit accordingly to put the core logic in a wait state. Coupled to the external bus circuit is data means for storing a data float wait state value for each memory device.

The data means outputs a data float wait state value to the external bus circuit in response to the memory device selected. The external bus circuit detects the occurrence of an external read followed by an access to another external memory and initiates a date float wait state for a period proportional to the wait state value corresponding to the accessed memory, i.e. wait state x clock period. However, if the external bus circuit detects a write operation followed by a read operation, then no data float wait state occurs, although a classical wait state may still occur. Similarly, if an external read operation is followed by an internal access, then no data float wait state will occur.

BEST MODE FOR CARRYING OUT THE INVENTION

Figure 1:
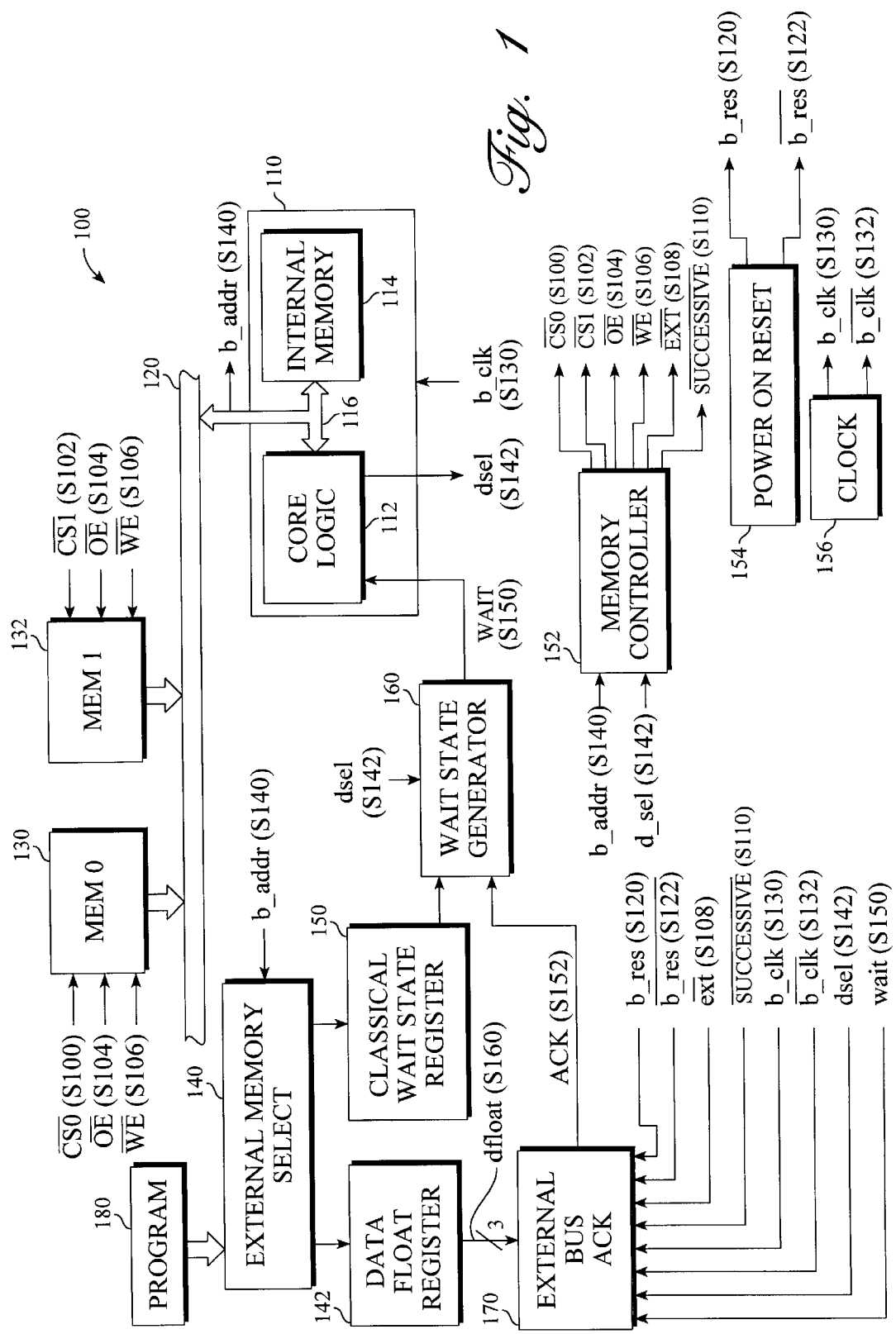
FIG. 1 is a block diagram of a data processing system in accordance with the invention.

Referring to FIG. 1, a data processing system 100 in accordance with the present invention comprises various subsystems organized around a system bus 120. A microprocessing unit 110 such as a microcontroller or the like includes core logic 112 and an internal memory 114. An external clock 156 provides clocking signal s130 to drive microprocessing unit 110. Data transfer between core logic 112 and memory 114 occur over internal bus 116. The internal bus is coupled to system bus 120 to provide data transfer external to microprocessing unit 110. Coming off of bus 116 are memory address lines s140 which feed into memory controller 152. Core logic 112 provides data select signal s142, indicating that the core requires a data transfer (read or write). In particular, signal s142 HI indicates a data transfer cycle while signal s142 LO indicates an address cycle. The data select signal feeds into memory controller 152 and into wait state generator 160.

Also connected to system bus 120 are external memories 130 and 132. Typical external memories include EEPROM, FLASH, and SRAM. Memories 130 and 132 are controlled by typical control signals, such as chip select signal s100, output enable signal s104 and write enable signal s106 for memory 130, and chip select signal s102, output enable signal s104 and write enable signal s106 for memory 132. These signals originate in memory controller 152 depending on the I/O operation and the address presented on address lines s140. The memory controller also produces an external read signal s108, indicating a read cycle with memory external to microprocessing unit 110. The memory controller also produces a successive read signal s110, indicating the occurrence of a read operation from the same previously accessed memory.

A wait state generator 160 provides a wait signal s150 (active HI) which feeds into core logic 112. Asserting signal s150 causes the core logic to enter a wait state, while de-asserting signal s150 allows the core logic to continue. Wait state generator 160 receives a wait state number from classical wait state register 150. Wait state generator 160 also receives data select signal s142, indicating that a data transfer is about to occur. In accordance with conventional operation, wait signal s150 is generated when an external memory is accessed in order to put microprocessing unit 110 in a wait state for a period of time sufficient to allow the external memory location to be accessed. This period of time is based on a value produced by classical wait state register 150.

In accordance with the invention there is external memory select logic 140 which serves to store wait state numbers for different memory types. Typically, each memory type is associated with an address range. Thus, the address for a given datum indicates the type of memory in which the datum is stored. Hence, address lines s140 feed into external select logic 140, which then outputs the wait state numbers of the memory device corresponding to the address presented on the lines. As can be seen, each memory has two associated wait state numbers, a classical wait state number and a data float wait state number. The classical wait state number is the prior art wait state number used to put the CPU in a wait state for a period of time sufficient to allow an addressed datum to be fetched and driven onto system bus 120. The classical wait state number corresponding to a given address is stored in register 150, and from there feeds into wait state generator 160.

External select logic 140 also provides a data float wait state number which is stored in data float register 142. Three data float bits s160 from the data float register feed into external bus logic 170. In addition, the external bus logic receives external read signal s108, successive read signal s110, data select signal s142, and wait signal s150 from wait state generator 160. Based on these input signals, external bus logic 170 will produce an ACK signal s152 (active HI) that feeds into the wait state generator to assert wait signal s150 when ACK signal s152 is LO.

The address ranges and wait state numbers are provided by way of user-provided program code 180. In one embodiment, external memory select logic 140 includes a plurality of registers that can be accessed via a memory mapped scheme, wherein the registers have associated addresses accessible under program control. A user can program the registers with an address range and corresponding wait state numbers, both classical and data float.

Completing the description of FIG. 1, there is a power on reset circuit 154 which supplies the reset signal s120 and its complement signal s122. There is a clock circuit which provides clock signal s130 and its complement s132.

Figure 2:
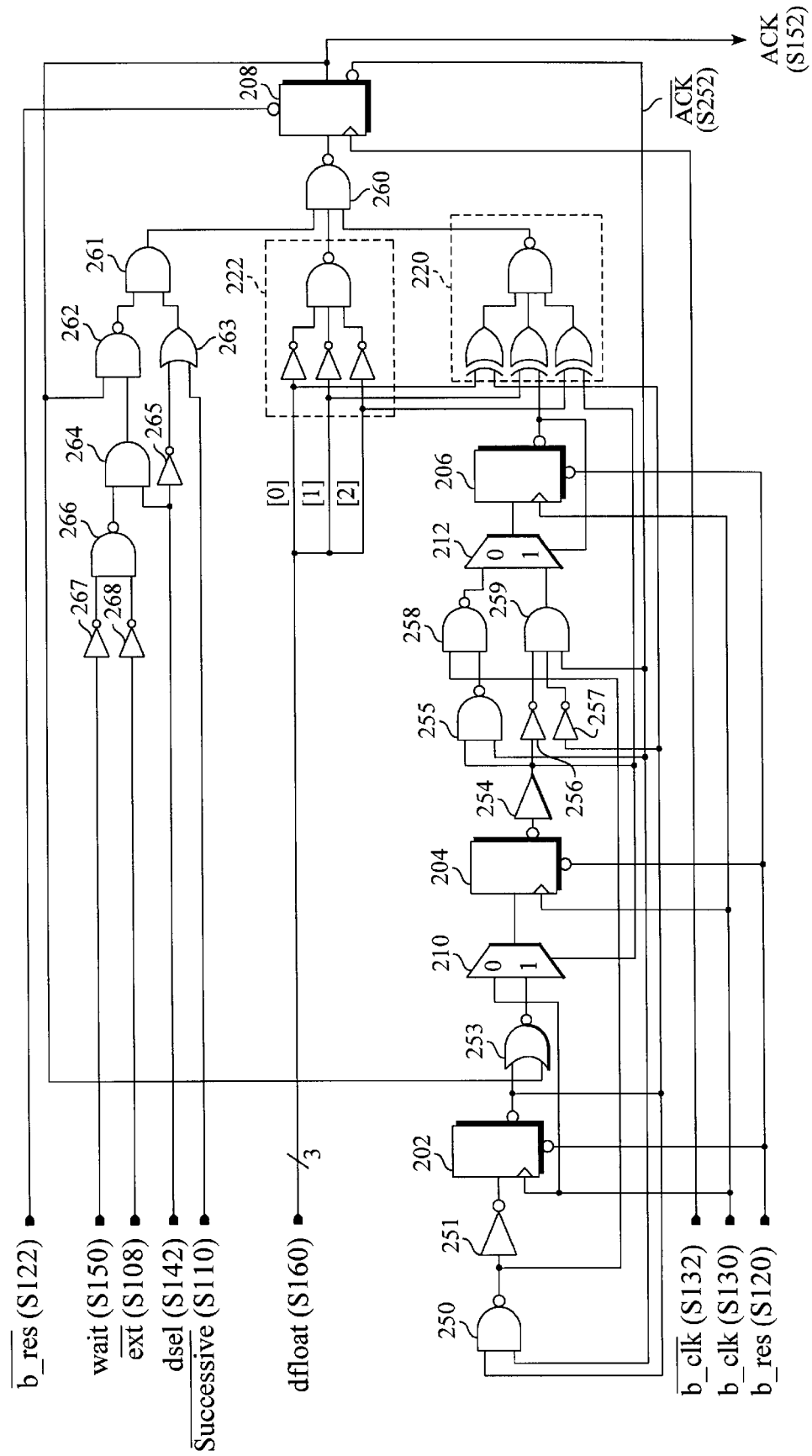
FIG. 2 is a block diagram of the external bus acknowledge logic shown in FIG. 1.

Referring now to FIG. 2, the circuitry comprising external bus logic 170 is shown. There is counter logic consisting of flip-flops 202, 204, and 206 which is clocked by clock signal s130. The output of the counter logic consists of the inverted outputs of the individual flip-flops. These outputs feed into a comparator circuit 220, comprising three XOR gates coupled to a NAND gate. An input of each XOR gate is coupled to the inverted output of flip-flops 202–206, with the exception that the output of flip-flop 204 is driven by buffer 254 and then fed into comparator circuit 220. The other inputs to the comparator comes from data float bits s160. The output of comparator 220 feeds into an input of a NAND gate 260.

The data float bits s160 are OR'd together by logic circuitry 222. The result of the OR operation feeds into another input of NAND gate 260.

Wait signal s150 and external read signal s108 feed into inverters 267 and 268 respectively, the outputs of which are coupled through NAND gate 266. The inverters and the NAND gate together operate as an OR gate. The output of NAND gate 266 feeds into an input of AND gate 264. Data select signal s142 is coupled to the other input of AND gate 264. The output of AND gate 264 is coupled to an input of NAND gate 262. The other input to NAND gate 262 is coupled to the output of flip-flop 208.

The data select signal s142 is also inverted through inverter 265 and is OR'd with successive read signal s110 via OR gate 263. The output of OR gate 263 and the output of NAND gate 262 are coupled via AND gate 261, the output of which feeds into a third input of NAND gate 260. NAND gate 260 in turn feeds into flip-flop 208, which produces ACK signal s152.

Returning to the counter logic, flip-flop 202 is driven by NAND gate 250 through inverter 251. The NAND gate receives the inverted output of flip-flop 202 and the inverted output of flip-flop 208. Proceeding forward, NOR gate 253 receives the inverted output of flip-flop 202 and the non-inverted output of flip-flop 208. The output of NOR gate 253 feeds into input 1 of mux 210. The other input to mux 210 is coupled to clock signal s130. The output of the mux feeds into flip-flop 204.

The inverted output of flip-flop 204 feeds (via buffer 254) into NAND gate 255 and inverter 256, and is the selector control for mux 210. NAND gate 255 also receives the inverted output of flip-flop 208. The outputs of NAND gates 250 and 255 are coupled to NAND gate 258. Inverter 256 is coupled to AND gate 259, which also receives input from the inverted output of flip-flop 202 via inverter 257, and input from the inverted output of flip-flop 208. The outputs of gates 258 and 259 respectively feed into inputs 0 and 1 of mux 212. The output of mux 212 is input to flip-flop 206, the inverted output of which serves as the select input of mux 212.

Operation of external bus logic 170 will now be explained. Generally, for an external memory access, the data float value corresponding to the accessed memory is loaded from external select logic 140 into data float register 142. After a read cycle, the counter logic (flip-flops 202, 204 and 206) will begin incrementing up to the data float value (signal s160). During counting, ACK signal s152 is de-asserted (LO), indicating that system bus 120 is still being driven by the output buffer of the memory that was read. In response, wait state generator 160 asserts wait signal s150 to put microcontroller 110 into a wait state. Once the counter reaches the data float value s160, the counter will reset and ACK signal s152 will go HI indicating that system bus 120 is free.

Various operating configurations of external bus logic 170 are best explained in connection with the timing diagrams depicted in FIGS. 3–6. The timing charts are the product of a simulation of external bus logic 170 shown in FIG. 2. The simulation was made using a VeriLog XL simulator manufactured by Cadence.

Figure 3:
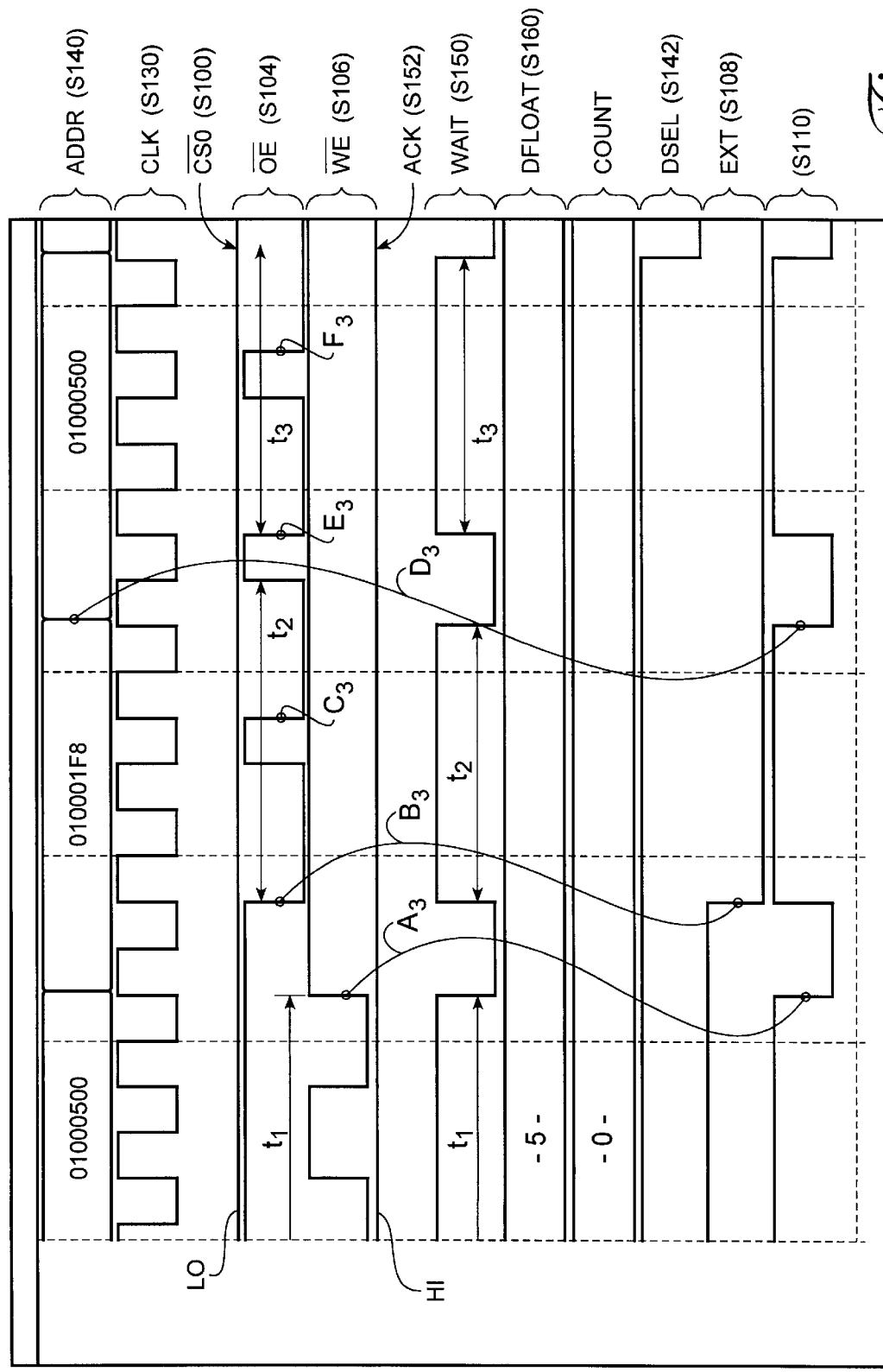
FIGS. 3–6 are timing diagrams illustrating various operating configurations of the data processing system in accordance with the memory access scheme of the present invention.

With reference to FIGS. 1, 2 and 3, assume that memory 130 (MEM0) is an 8-bit memory whose addresses have uppermost bits equal to "0x010". External select logic 140 is programmed to associate a data float wait state number of five for addresses beginning with 0x010. The timing chart of FIG. 3 illustrates the signaling for a write operation followed by two successive read operations with memory MEM0. In addition, the write and read operations involve 16-bit words, thus each I/O operation consists of two 8-bit memory accesses (low-byte, high-byte).

The top of the timing chart in FIG. 3 shows memory address signals s140 and clock signal s130. Chip select s100 (CS0, active LO) indicates that MEM0 is selected. The first address accessed is 0x01000500. Upon asserting this address on address bus s140, external select logic 140 outputs a five into data float register 142. Consequently, data float bits s160 assert a five.

During time period t1, write enable signal s106 is asserted (active LO) twice at which times low and high bytes are written into memory location 0x01000500. Because the operation is a WRITE, data transfer signal s142 is asserted and external read signal s108 is de-asserted (active LO). Thus in accordance with the invention as embodied in logic circuit 170, ACK signal s152 remains asserted and the counter output (outputs of flip-flops 202, 204 and 206) remains low at the end of the WRITE cycle, denoted as event $A_3$ in FIG. 3, indicating that system bus 120 is free. Observe that during period t1, wait signal s150 is nonetheless asserted by wait state generator 160. This is the result of a classical wait state, produced in response to the write operation.

Note that successive read signal s110 is asserted by memory controller 152 at event $A_3$, since an access to the same memory (MEM0) is being performed, namely a read operation. The read operation occurs during time period t2 where output enable signal s104 is driven LO at event $B_3$ to output the first byte of the accessed word. Also at event $B_3$, external read signal s108 goes LO, indicating the occurrence of an external read access. The second byte is read at event $C_3$. Again, a classical wait state occurs during period t2 to provide sufficient time for the read operation to complete.

At event $D_3$ a new address is asserted, namely 0x01000500. Again, since the same memory (MEM0) is being accessed, successive read signal s110 is asserted. Consequently, in accordance with the invention, the counter does not begin counting and so flip-flop 208 continues to output HI thus asserting ACK signal s152 to indicate that system bus 120 is free.

Finishing off the discussion of FIG. 3, two READ accesses occur during time period t3 at events $E_3$ and $F_3$ to read out the two bytes constituting the word stored at memory location 0x01000500. The operation is accompanied by a classical wait state during the same period, indicated by wait signal s150 being asserted.

From the foregoing discussion of FIG. 3, it can be seen that external bus logic 170 does not initiate a wait state upon completion of a WRITE cycle, since a bus clash is not an issue. In addition, the bus logic does not initiate a wait state for successive reads from the same memory.

Figure 4:
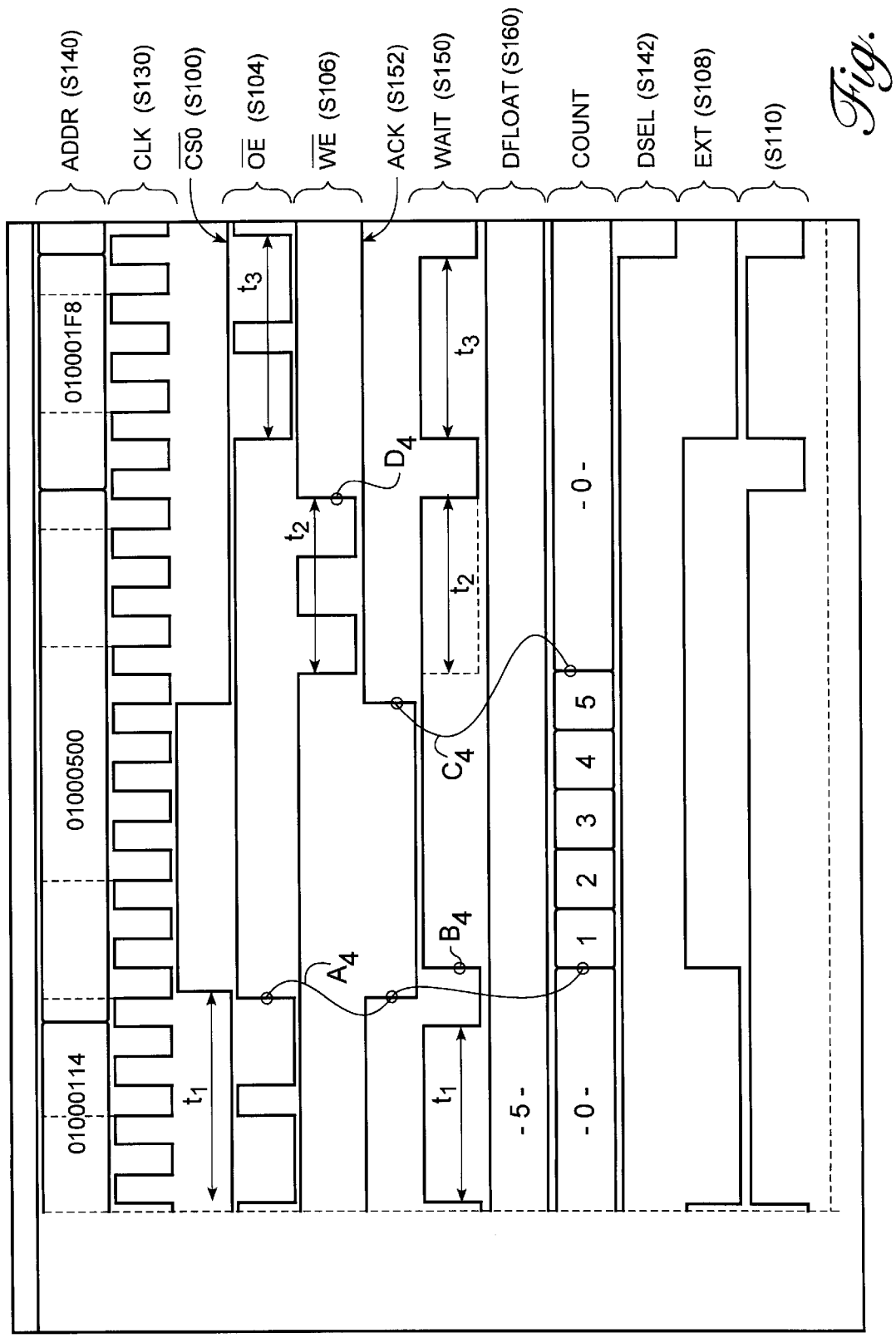

With reference to FIGS. 1, 2 and 4, assume that memory 130 (MEM0) is an 8-bit memory whose addresses have uppermost bits equal to "0x010". Assume further that external select logic 140 has been programmed to associate a data float wait state number of five for addresses beginning with 0x010. The timing chart of FIG. 4 illustrates the timing for a read operation from MEM0, followed by a write operation to MEM0, followed by a read operation from MEM0. As with FIG. 3, the write and read operations involve 16-bit words, thus each I/O operation consists of two 8-bit memory accesses (low-byte, high-byte).

As can be seen in FIG. 4, the read operation takes place during time period t1, accompanied by a corresponding classical wait state. Upon completion of the read at event $A_4$, output enable signal s104 is de-asserted and external read signal s108 is likewise de-asserted. ACK signal s152 is de-asserted, which causes the counter (flip-flops 202, 204, 206) to begin counting and wait state generator 160 to assert wait state signal s150 to indicate that system bus 120 is busy. As a consequence, CPU 110 goes into a wait state.

By comparison with prior art techniques, the next I/O operation would begin at event $B_4$, resulting in contention for the bus as the CPU attempts to drive its output data on system bus 120 at the same time that the output buffer of MEM0 is still holding onto the bus from its read operation. However, in accordance with the invention, by entering the wait state at event $B_4$ instead, the output driver of MEM0 is given enough time (five clocks) to release the system bus so that when the write operation does begin, the bus is free and there is no risk of garbled data due to bus contention between the microcontroller and MEM0.

Thus, at event $C_4$ when the counter counts up to five and comparator 220 detects equality with data float value s160, flip-flop 208 outputs HI to re-assert ACK signal s152. In response, wait state generator 160 should de-assert wait signal s150 as shown in dashed line. However, a classical wait state is inserted for a period of time t2 during the subsequent write operation. At the end of the write cycle (event $D_4$), the counter is not initiated because ACK signal s152 remains HI, since external select signal is asserted, and thus no wait state prior to the next I/O operation occurs. Recall that external bus logic 170 does not initiate the counter at the end of a write operation. However, it can be seen that a classical wait state still occurs for time period t3 during the read from memory location 0x010001f8.

In summary, the timing chart of FIG. 4 shows that the invention selectively asserts wait states depending on the operation that had just completed. In the case of an external read and if the data float register contains a non-zero value, a wait state occurs to allow the output driver to release the bus. In the case of a write operation, no wait state is initiated.

Figure 5:
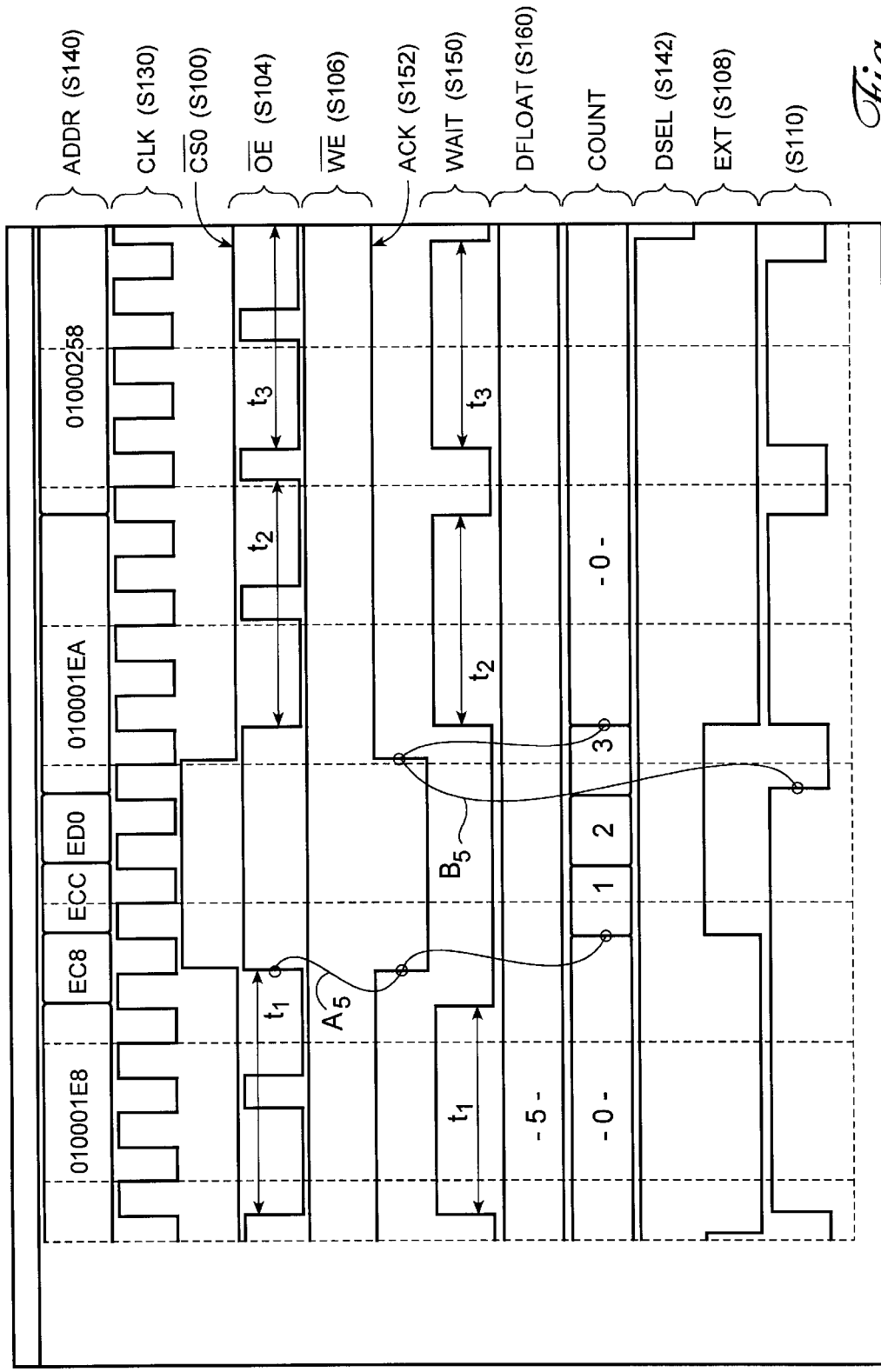

With reference to FIGS. 1, 2 and 5, assume that memory 130 (MEM0) is an 8-bit memory whose addresses have uppermost bits equal to "0x010". Assume further that internal memory 114 has addresses with uppermost bits equal to "0x000". External select logic 140 is programmed to associate a data float wait state number of five for addresses beginning with 0x010. The timing chart of FIG. 5 illustrates the signaling for a read operation from MEM0, followed by three successive read operations from internal memory 114, followed by another read operation from MEM0. The MEM0 read operations involve 16-bit words, thus each I/O operation consists of two 8-bit memory accesses (low-byte, high-byte).

The top of the timing chart in FIG. 5 shows memory address signals s140 and clock signal s130. The first read access is to external memory MEM0 from location 0x010001e8 during time period t1. Note that wait signal s150 is asserted during the same period, per classical wait state handling.

At the conclusion of the read operation at event $A_5$, ACK signal s152 goes LO, thus triggering the counter to begin counting. Recall that ACK LO indicates that system bus 120 is not free. However, it can be seen wait signal s150 remains de-asserted; the reason being that the subsequent read operation is to internal memory 114, which does not rely on system bus 120 being released by the output driver of MEM0.

Referring back to FIG. 1, external memory select 140 loads a zero into classical wait state register 150 when an internal memory address is detected. This feeds into wait state generator 160, which upon seeing a zero classical wait state value responds by maintaining wait signal s150 in the de-asserted state, regardless of the logic state of ACK signal s152. Since core logic 112 can access internal memory in a single clock, there is no need for a wait state to occur.

However, for the duration of the three internal reads from addresses 0x00000ec8, 0x00000ecc, and 0x00000ed0, the counter continues counting. The reason for sustaining this activity is that the output driver of MEM0 still needs time to electrically release the system bus and if the microprocessing unit 110 wanted to access external memory, it would have to enter the wait state until the counter completed; i.e. reached a value equal to data float value s160. Otherwise, a bus contention would occur.

On the other hand, if the same external memory is accessed, then there is no need to enter a wait state. This is precisely the situation depicted in FIG. 5. Note that at event $B_5$ successive read signal s110 goes LO to indicate that MEM0 is being accessed again. This causes ACK signal s152 to go HI which immediately resets the counter (flip flops 202, 204, 206) to zero. Two read operations from addresses 0x010001ea and 0x01000258 of MEM0 follow at time periods t2 and t3, along with their corresponding classical wait states.

To summarize the points brought up in FIG. 5, it can be seen that when an internal memory access follows a read operation from an external memory, the counter is still activated, but the CPU is not made to enter a wait state. This allows for the possibility of a subsequent external memory access where the CPU would be forced to wait for the completion of the counting so that the system bus can be released. However, if the external access is to the same external memory, then counting ceases immediately to provide access to the external memory without a wait state.

Figure 6:
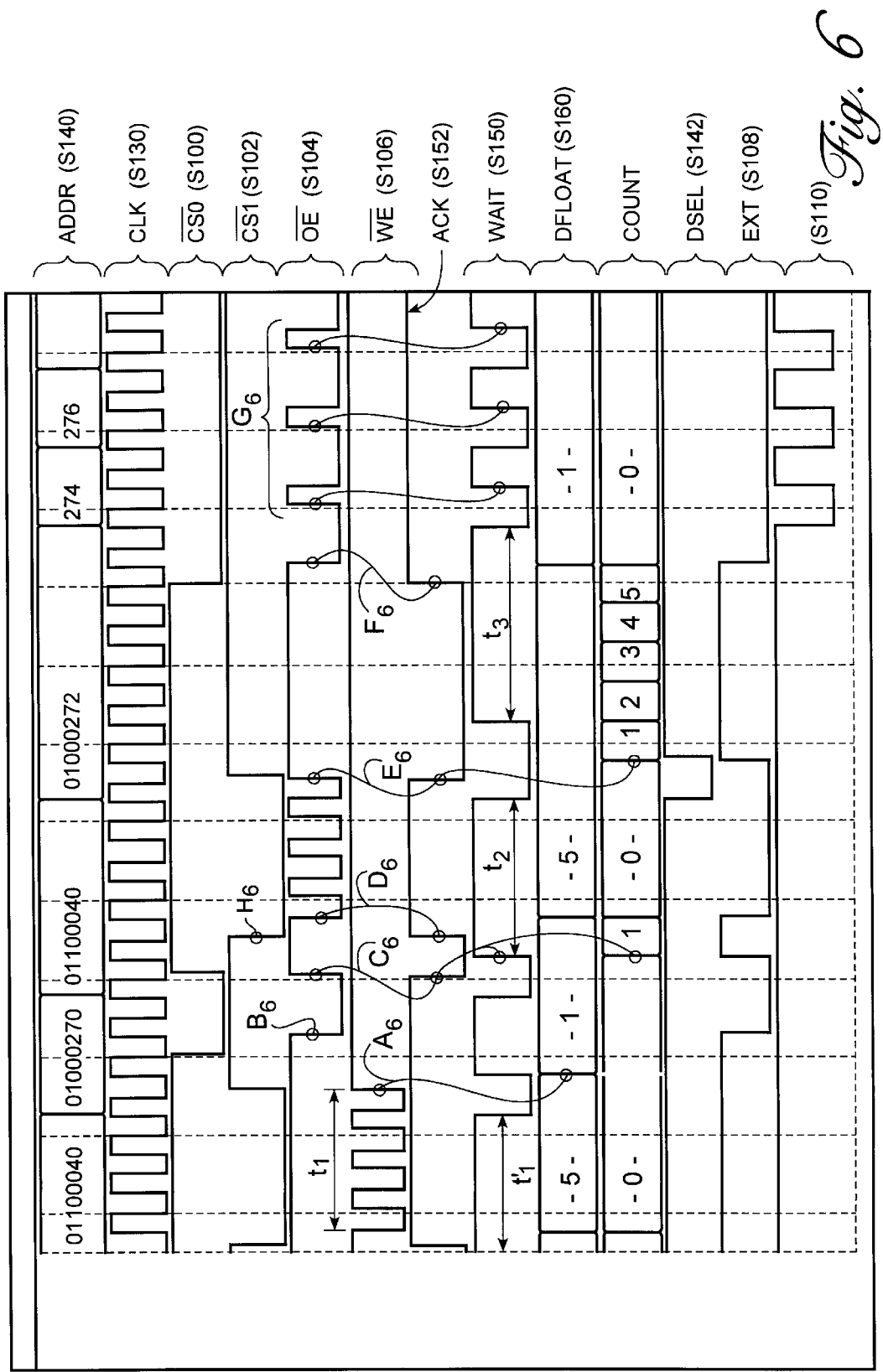

With reference to FIGS. 1, 2 and 6, assume that memory 130 (MEM0) is an 8-bit memory whose addresses have uppermost bits equal to "0x010" and that memory 132 (MEM1) is another 8-bit memory whose addresses have uppermost bits equal to "0x011". Assume further that external select logic 140 has been programmed to associate a data float wait state number of one for MEM0, and a data float value of five for MEM1. The timing chart of FIG. 6 illustrates the timing for a write operation to MEM1, followed by a read operation from MEM0, followed by a read operation from MEM1, followed by four read operations from MEM0. The read operations with MEM0 involve 8-bit data, so each I/O operation requires a single access. The write and read operations with MEM1 involve 32-bit words. Thus each I/O operation consists of four 8-bit memory accesses.

During time period t1, MEM1 is selected, as indicated by chip select signal s102 being asserted. Four write accesses are made to location 0x01100040. It can be seen that the selected data float s160 is five. Also, note that the wait state during period t1' is due to classical wait state generation.

Upon completion of the write cycle at event $A_6$, MEM0 is selected at address 0x01000270, along with a corresponding change of data float s160 to one. A read operation begins at event $B_6$ and completes at $C_6$, when MEM1 is reselected for address 0x01100040. The counter begins counting, thus making flip-flop 208 go LO, which in turn causes a wait state to occur. Since data float is one, the counter makes one count and flip-flop 208 goes HI at $D_6$. This wait state between event $C_6$ and $D_6$ allows the MEM0 output drivers to release the system bus 120 so that subsequent reading out of MEM1 at event $D_6$ can proceed without risk of a bus clash. Thus, the wait state during time period t2 is due to both the data float from reading MEM0 and to classical wait state generation during the reading of MEM1.

When MEM1 is selected at $H_6$, it can be seen that data float s160 is once again set to the data float value of five. Upon completion of the read operation at event $E_6$, the counter begins counting, this time for a count of five. ACK signal s152 goes LO for a corresponding period of time, indicating that MEM1 is releasing the system bus. Upon reaching a count of five, ACK signal s152 goes HI, and the reading continues with MEM0 at location 0x0100274 (event $F_6$). Again, the wait state during time period t3 consists of a data float wait state and a classical wait state. The subsequent reads during event $G_6$ occur with the same memory MEM0, and so do not require data float wait states after each read operation. However, classical wait states are still generated.

From the foregoing discussion of FIG. 6, it can be seen that the data float value s160 changes depending on the memory being accessed. A data float value can be selected by the user on a per memory device basis. This allows for long delays for slow memories and short delays for fast memories, rather than having to specify a single, worst case delay for the slowest memory. This approach prevents bus clashes among different memory devices, while at the same time minimizing the delay between successive I/O operations involving different memories.

Figure 7:
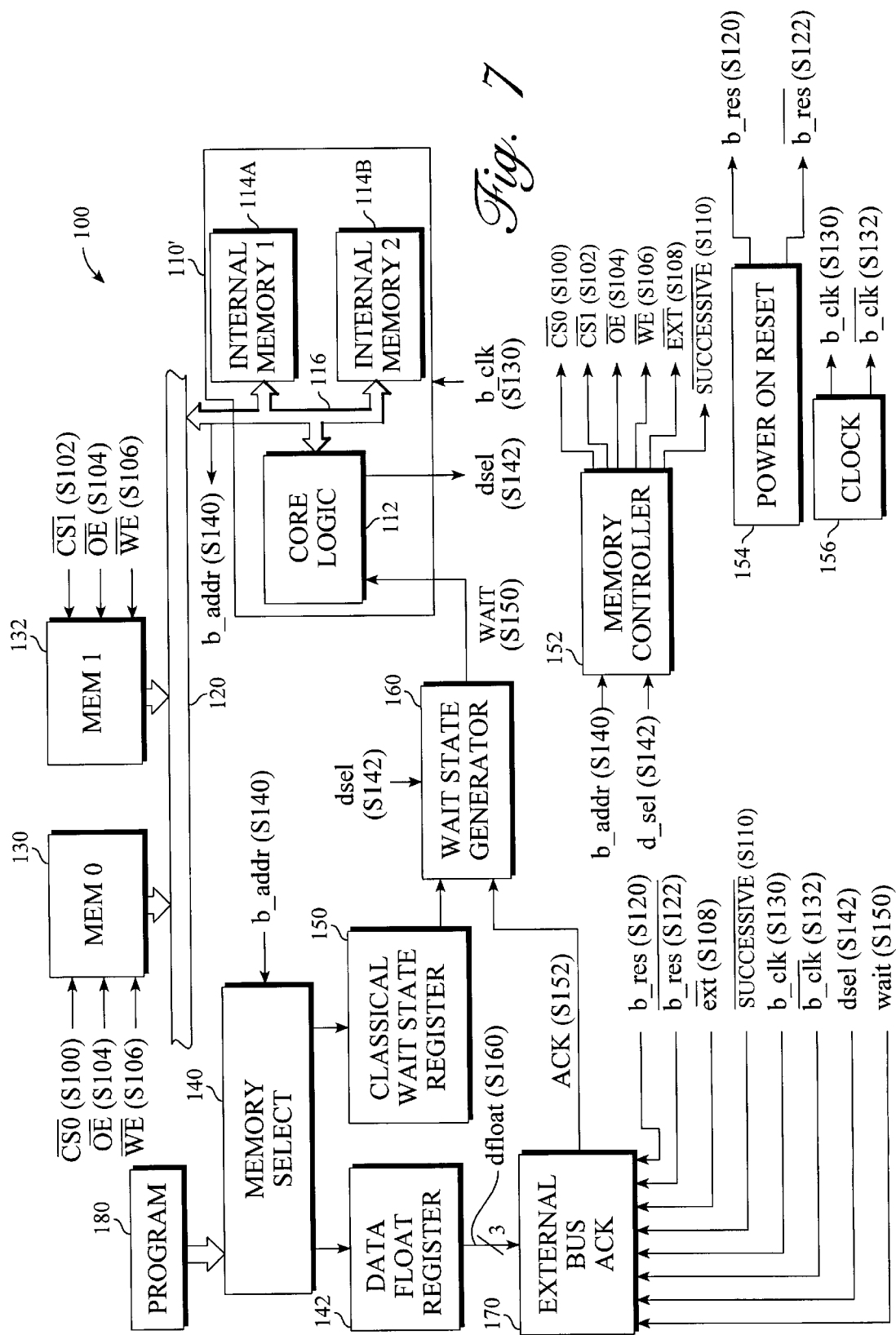
FIG. 7 is a block diagram of an alternate embodiment of the data processing system.

The data float wait state approach of the invention can be applied to architectures having multiple types of internal memories, each potentially contending for access to the internal bus 116 and each having a different timing requirement for releasing the data bus upon completion of a read cycle. For example, FIG. 7 shows a variation of FIG. 1 in which micro 110' includes two internal memories 114A and 114B. As can be seen, the same potential for bus conflicts exists with internal bus 116 in the architecture of FIG. 7 as exists with external bus 120. The principles set forth in the foregoing discussions of FIGS. 3–6 could be readily adapted by persons of ordinary skill in the art to a multiple internal memory architecture, such as shown in FIG. 7.

What is claimed is:

1. In a computing device having a first memory and a second memory, the first and second memories coupled to a common data bus, a method of accessing the first and second memories comprising the steps of:

associating a first wait state value to the first memory;

associating a second wait state value to the second memory;

carrying out a first I/O operation on a selected one of the memories;

making a determination as to whether to place the computing device in a wait state, said determination being based on a sequence of I/O operations being performed on the memories;

placing the computing device in a wait state for a period of time proportional to the wait state value associated with the selected memory when the determination is affirmative;

refraining from placing the computing device in a wait state when the determination is negative; and performing a next I/O operation with the other of the first and second memories.

2. The method of claim 1 wherein the step of carrying out a first I/O operation on the selected one of the memories is preceded by a step of writing to said selected one of the memories, followed immediately by the step of reading without the addition of a wait state.

3. The method of claim 1 wherein the step of carrying out a first I/O operation on the selected one of the memories includes successively reading a plurality of data therefrom without the addition of wait states between said successive reading of data.

4. The method of claim 1 wherein the step of placing the computing device in a wait state includes selecting the wait state value associated with the selected memory and counting to a number equal to that value.

5. The method of claim 1 wherein the first and second memories are external memories.

6. The method of claim 1 wherein the first and second memories are internal memories.

7. The method of claim 1 wherein the first and second wait state values are based on a characteristic of respective output circuitry of the first and second memories.

8. The method of claim 7 wherein the first and second wait state values are further based on the frequency of a clock used by the computing device.

9. The method of claim 7 wherein the characteristic is the time required for the output circuitry to achieve a high impedance state after a read operation.

10. The method of claim 1 wherein said first and second memories are external memories and said computing device further having a third internal memory (114), said method including steps for accessing said third memory, said steps comprising:

Upon completion of the step of carrying out a first I/O operation on said selected one of the first and second memories, immediately proceeding with the next internal I/O operation to said third memory without the addition of a wait state.

11. The method of claim 10 wherein if an external read operation subsequent to said internal I/O operation is directed to said selected one of the first and second memories, then proceeding said internal I/O operation immediately with said external read operation to said selected one of the memories without the addition of a wait state.

12. The method of claim 10 wherein if an external read operation subsequent to said internal I/O operation is directed to the other of said selected one of the memories, then upon completion of said internal I/O operation, placing the computing device in a wait state for a period of time proportional to the wait state value associated with said selected memory.

13. A microprocessing device comprising:

a system bus (120);

logic (110, 152) coupled to the system bus, the logic having at least a first internal memory (114a) and a first output of a first signal (s108), the first signal having a first logic state during a read operation with an external memory and a second logic state otherwise; at least a first external memory (130) coupled to the system bus;

a wait state circuit (160) having a second output of a second signal (s150) coupled to the logic (110, 152), whereby the logic enters a wait state in response to the second signal being asserted;

an external bus control circuit (170) having a counting circuit (202, 204, 206), a comparison circuit (220), and a third output of a third signal (s152) coupled to the wait state circuit (160) whereby the wait state circuit asserts and de-asserts the second signal in response to the third signal being asserted and de-asserted; and data means (140, 142) for storing a plurality of wait state values, one of said wait state values corresponding to said first external memory (130);

the external bus control circuit (170) asserting the third signal (s152) as a function of the state of the first signal (s108);

the counting circuit (202, 204, 206) initiating a counting sequence in response to the first signal changing from the first logic state to the second logic state;

the comparison circuit (220) having a first input coupled to the data means (140, 142) to receive a selected one of the wait state values and a second input coupled to receive a count output from the counter;

the comparison circuit de-asserting the third signal when its inputs become equal; the logic (110, 152) including a fourth output of a fourth signal (s110) indicating consecutive read operations to the same memory, the fourth output coupled to the external bus control circuit (170), the external bus control circuit further asserting the third signal as a function of the state of the fourth signal.

14. The microprocessor device of claim 13 wherein the logic (110, 152) generates memory addresses (s140) and the data means (140, 142) includes a selector (140) for producing one of the wait state values in response to a generated memory address.

15. The microprocessing device of claim 13 further including programming means (180) for selectively loading wait state numbers into the data means (140, 142).

* * * * *